United States Patent [19]

Masterson

[11] 4,012,112
[45] Mar. 15, 1977

[54] MICROSCOPE STAGE POSITIONING SYSTEM

[75] Inventor: Earl E. Masterson, Minneapolis, Minn.

[73] Assignee: Honeywell Inc., Minneapolis, Minn.

[22] Filed: Aug. 25, 1975

[21] Appl. No.: 607,634

[52] U.S. Cl. .................................. 350/90; 350/86
[51] Int. Cl.² ........................................ G02B 21/26
[58] Field of Search ................. 350/86, 87, 90, 81; 33/1 M, 174 TA; 108/137, 138, 143, 20; 269/69, 71; 250/311

[56] References Cited

UNITED STATES PATENTS

| | | | |
|---|---|---|---|
| 3,010,363 | 11/1961 | Malfeld | 350/86 X |
| 3,508,049 | 4/1970 | Riecke | 250/311 |
| 3,517,904 | 6/1970 | Verchain | 350/86 X |

*Primary Examiner*—David H. Rubin
*Attorney, Agent, or Firm*—Charles G. Mersereau

[57] ABSTRACT

An automatically controllable microscope stage positioning system capable of repeatable, precise adjustment for use in an automatic scanning microscope is disclosed. The system includes a slide tray in which an object slide is mounted and which is adjustable in the $x$—$y$ plane and along the $z$ axis to achieve automatic scanning and focusing functions in the automated microscope system. The positioning is achieved by using $x$, $y$ and $z$ axially adjustable lead screws which operate through non-rotating contact nuts to apply a force to move the stage in one direction along each of said $x$, $y$ and $z$ axes. Return springs which apply a force vector opposite that of the lead screws maintains the stage against the reversible lead screws at all times. Guide means are also provided for maintaining the alignment of the slide tray in both the $x$—$y$ plane and along the $z$ axis. The drive is controlled by means of signals generated by the automatic microscope signal processing system.

15 Claims, 10 Drawing Figures

MICROSCOPE STAGE POSITIONING SYSTEM

CROSS-REFERENCE TO RELATED APPLICATION

Reference is made to a co-pending application by Earl E. Masterson, the inventor in this application, Ser. No. 607,514, filed of even date and assigned to the same assignee as the present invention. That application is also concerned with a system for use in a scanning automated microscope. By that invention a precision slide positioning system is disclosed which includes a pair of oppositely disposed, resiliently held slide retainers which operate to urge a specimen slide against fixed alignment registration guides on the slide tray to retain the slide in a predetermined fixed parallel relation thereto. The slide is, in turn, held in adjustable fixed alignment with the traverse plate of the microscope stage. A release mechanism mechanically linked to both of the retainers is provided to withdraw the resiliently held retainers for ease of slide removal and insertion. Thus, that application accomplishes rigid, repeatable positive location of a microscope object specimen slide relative to the movable stage of a scanning automated microscope such that a predetermined field of view based on perpendicular axis in the plane of the slide tray can be automatically recalled after removal and subsequent replacement of the slide on the slide tray.

The present invention, on the other hand, concerns the system for positioning the microscope stage itself upon which the system for mounting the slide is located. It, therefore, is not directly concerned with the actual mounting and clamping of the slide on the slide tray.

BACKGROUND OF THE INVENTION

The present invention is related generally to the field of microscopic examination of objects including slides containing biological specimens. One important example of this is the identifying and counting of the different types of white blood cells found in a smear of whole blood as well as other evaluations which require microscopic optical analysis of the blood. Generally, in the past the task of finding, identifying and counting white blood cells along with the performance tests such as evaluating red blood cell morphology, platelet sufficiency, and other commonly utilized studies has been a tedious and time consuming manual task. Recently, much effort has been expended in an effort to automate the examination of blood smears. An automated, computerized scanning system that enables an operator to perform leukocyte differential counts, red blood cell morphology studies, platelet sufficiency estimates and other required evaluations is illustrated and described in the co-pending application of Adkisson, et al., Ser. No. 607,741 filed of even date and assigned to the same assignee as the present invention.

The present invention, in particular, involves an automatically controlled, precision microscope stage positioning system for use with an automated scanning microscope system.

SUMMARY OF THE INVENTION

By means of the present invention, there is provided a precision, automatically controllable microscope stage positioning system which includes an adjustable microscope stage having a carriage for mounting an object slide which is adjustable in the plane parallel to the surface of the stage determined by $x$ and $y$ axis coordinates (normally horizontal) and along the $z$ axis perpendicular to the $x$—$y$ plane (normally vertical). $X$, $y$ and $z$ axis stage drives each of which includes an encoder-controlled servo motor provides precise adjustment in the desired direction along each axis. Thus, in the preferred embodiment, in the $x$—$y$ plane, the servo motor drives axially adjustable screws which operate against guide surfaces on the stage. The stage is continually held against the adjustable screws by means of vector springs which provide a force vector opposite that of the axially adjustable screws. The $z$ motor is provided with a similar screw arrangement which operates on a wedge positioned between the stage and a base and is also spring loaded such that movement of the wedge by either the operation of the screw or the return spring causes a corresponding motion of the stage along the $z$ axis. The wedge is supported by leveling screws touching its underside which are adjusted so that the top side of the wedge is parallel to the $x$—$y$ plane and the wedge is guided by fixed guide rollers which are so located as to maintain contact with the surfaces of the wedge to maintain its precise alignment.

The alignment of the stage in the $x$—$y$ plane is maintained by providing a pair of $y$ drive screws which are simultaneously driven as by a sprocket and chain drive such that, in cooperation with the spring means holding the stage against the screws, the stage is maintained parallel to a line joining the ends of the two screws. Because of the cooperation of the return springs, the stage is also maintained in this parallel position during movement along the $x$ axis by pressure on the same two $y$ screws.

Each of the driven screws is further provided with contact nuts which operate against wear or bearing surfaces on the corresponding driven portion of the stage or wedge. Each is also provided with a special anti-rotation system which prevents rotation of the contact nut with rotation of the corresponding screw.

BRIEF DESCRIPTION OF THE DRAWINGS

In the drawings wherein like numerals are utilized to depict like parts throughout the same.

DESCRIPTION OF THE PREFERRED EMBODIMENT

Figure 1:
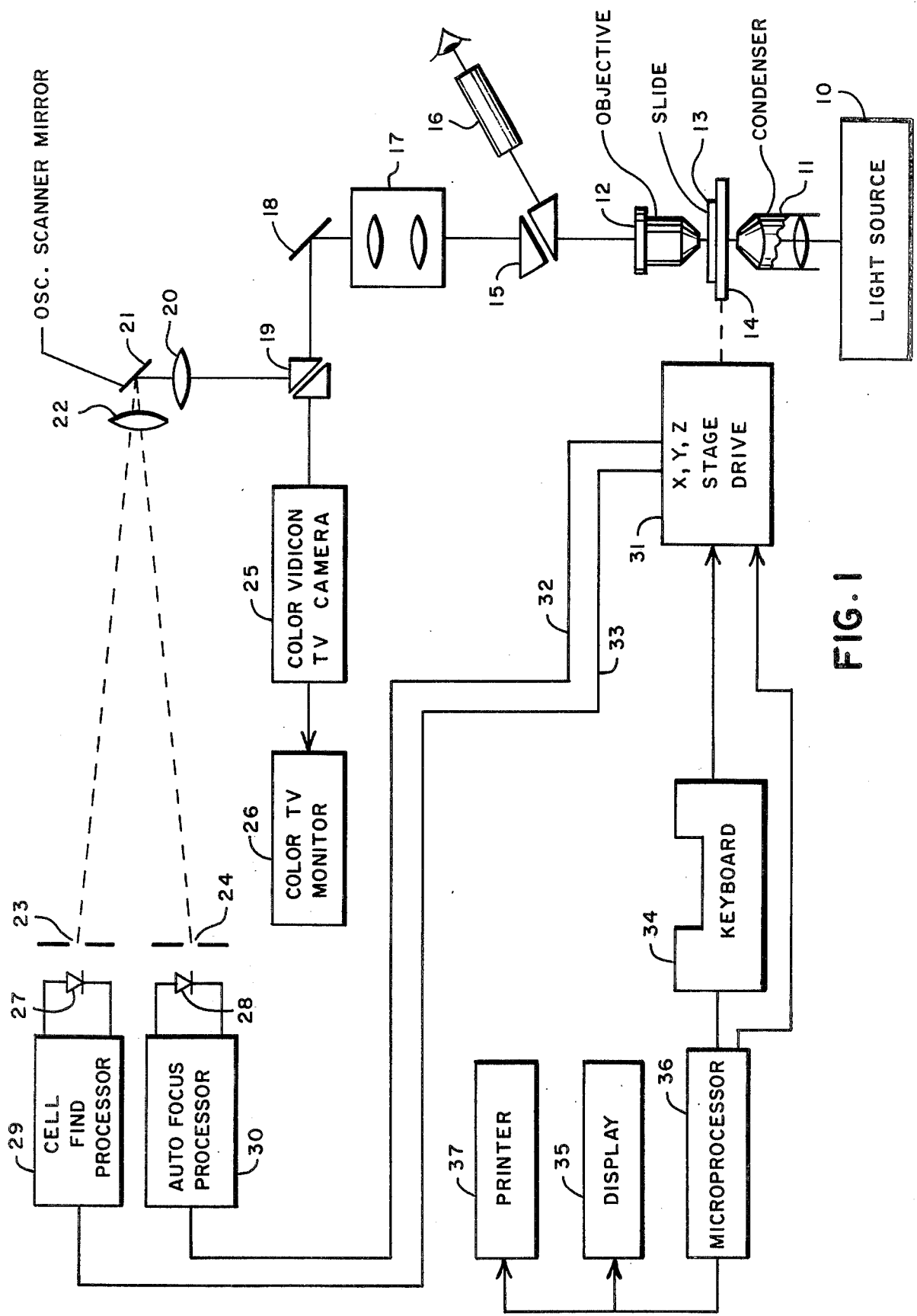
FIG. 1 is a functional block diagram of a scanning automated microscope system utilizing the stage positioning system of the invention.

In the drawings, and, in particular, FIG. 1 thereof, there is disclosed in block form an automated scanning microscope system such as that which may be used to automatically find and focus on white blood cells as for a leukocyte differential count including a stage positioning system which utilizes the present invention. Thus, there is provided a light source 10, a conventional condenser lens 11, an objective lens 12 with an objective specimen slide 13 mounted in typical fashion as on movable microscope stage 14 associated with the positioning system of the present invention. A beam splitter is illustrated at 15 associated with viewing eyepiece 16 and imaging lens assembly 17. The remainder of the optical system may include a mirror 18, a second beam splitter 19, additional lens 20, optical scanner 21, which may be an oscillating mirror, a further focusing lens 22, through which the scanner scans to direct light through the lens 22 to apertures 23 and 24.

The automated system which detects and utilizes the optical data to further control the microscope system may include a color vidicon TV camera 25 which together with a monitor 26 may provide a real time presentation of the field of view on the specimen slide 13 to an observer. In one successful embodiment the TV camera utilized is a Toshiba Model 1K-12, and the TV monitor is a Sony Model KV-5000 which are available from the named manufacturers. Automated cell find and focus systems may also be provided including detectors which may be photo diodes 27 and 28 associated with cell find and auto focus signal processors 29 and 30, respectively. The processing units 29 and 30 are utilized to control the automatic mechanical stage drive as at 31 through conductors 32 and 33. If desired, a single photo diode may be substituted for the two diodes 27 and 28 and utilized as the light responsive means for both the cell find and auto focus operations. Control of the entire operation may be achieved by the medical technologist or other observer through a keyboard 34 which operates in conjunction with a display 35. The automated operations are controlled by a programmed microprocessor 36 which evaluates the input data from relevant sources and determines the automated operation sequence therefrom. A printer 37 may be provided to present a printout of the relevant data such as that associated with a leukocyte differential count.

Briefly, the operation of the system is basically as follows. Light emanating from the source 10 traverses the condenser lens 11, the specimen slide 13 and objective lens 12 to the beam splitter 15 where a small portion thereof is reflected by the beam splitter system 15 to the eyepiece 16 and a larger portion continues substantially undeviated through imaging lens assembly 17, is reflected by mirror 18 to the second beam splitter 19 at which point approximately half of the remaining light continues to the vidicon camera 25 which produces a color TV picture on the monitor 26. The other half of the beam is reflected by the beam splitter 19 through lens 20 to oscillating scanner mirror 21, which may be an oscillating galvanometer mirror, which provides a continuously recurring scan across the optical field of view to light responsive diodes 27 and 28 through apertures 23 and 24, respectively. The electrical output of photo diode 17 is passed on to cell find processor 29, the output of which is connected through 33 to the $x-y$ portion of the stage drive 31 which causes the stage to stop and center a cell on the optical axis when such has been detected. The electrical signal from the auto focus diode 28 is utilized by the auto focus processor 30 to actuate the $z$ axis of the stage drive 31 to bring the cell, which has been detected and centered, into proper focus. This operation is normally sequential with the auto focus system inhibited during the cell find operation.

The automated operations are controlled by a programmed microprocessor 36 which evaluates the input data from relevant sources and determines the automated operation sequence therefrom. In the same successful embodiment described, the microprocessor included a conventional Central Processor Unit (CPU) which was a Model Intel 8008-1, sold by Intel Corporation. The 8008-1 is a single chip MOS 8-bit parallel CPU. This 8008-1 is described in the Intel Corp. literature such as "Intel MCS-8 User's Manual, Nov., 1974". The four basic functional blocks of the 8008-1 processor are an instruction register, memory, arithmetic-logic unit and I/O buffers. It includes six 8-bit data registers, and 8-bit accumulator, two 8-bit temporary registers, four flag bits, and an 8-bit parallel binary arithmetic unit which implements addition, subtraction, and logical operations. A memory stack containing a 14-bit program counter and seven 14-bit words is used internally to store program and subroutine addresses. The 14-bit address permits the direct addressing of 16k words of memory. More detailed explanation of and instructions for the 8008-1 may be found in the manual listed above.

The above-mentioned microprocessor 36 is used in a conventional fashion to store $x-y$ coordinate addresses which represent a precise stage location of interest observed during a differential count or other procedure by the operator. Thus, if the operator notes an unusual situation or other item of interest which he later wants to call to the attention of the pathologist or other appropriate person at a later time, he may simply note down the $x$ and $y$ coordinates of the desired location for the stage as presented in the display. At a later time, when the same $x$ and $y$ coordinates are read into the system, these coordinates may be used to issue a signal causing the microscope stage to be driven to the location of the given pair of coordinates in a repeatable fashion.

The total system generally presented in FIG. 1 is one in which the stage positioning system of the present invention has been successfully used but the other details of which do not form a part of the present invention and therefore have been described only generally. A more detailed description of the remainder of the system may be found in above-referenced co-pending application of Adkisson, et al.

Figure 2:
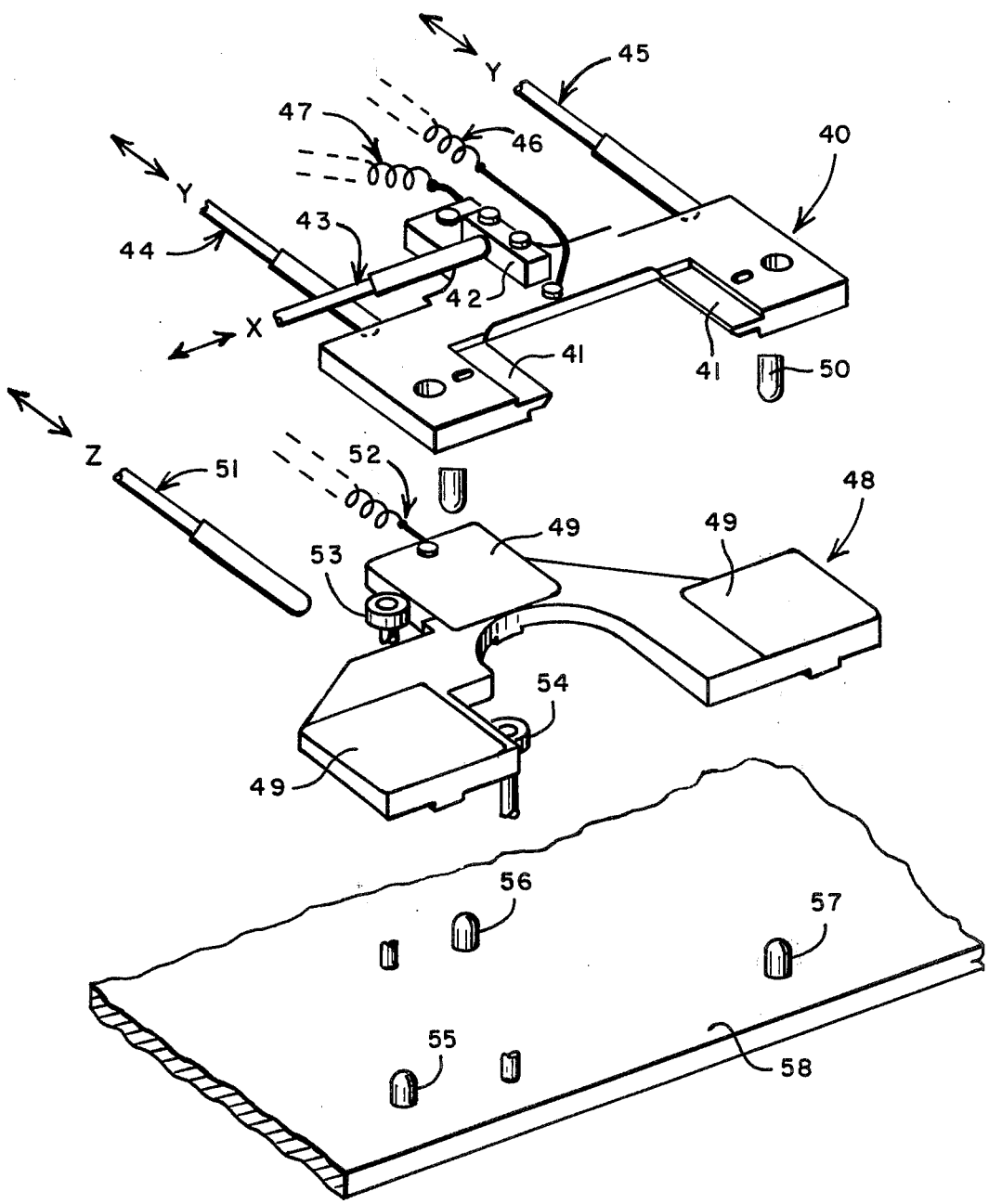
FIG. 2 is an exploded view of the stage positioning system of the invention.

FIG. 2 is an exploded view which illustrates generally the assembly of the stage positioning system of the invention. The microscope stage plate or slide tray 40 is provided with recesses shown generally at 41 in which a specimen slide can be positively positioned. The slide tray 40 is provided with a raised member 42 which is operated on by an $x$-directed lead screw 43. A pair of $y$-directed lead screws 44 and 45 are also provided. The $x$ and $y$ directed lead screws operate in conjunction with a pair of vector or return springs 46 and 47 to position the slide tray 40 in the $x-y$ plane as described in greater detail in conjunction with FIG. 3, below. The slide tray 40 is supported on a movable wedge member 48 in a manner which allows free relative motion between slide tray 40 and wedge member 48 as by the use of wear areas or bearing surfaces 49, which may be machined on the wedge 48. Leveling screws 50 (FIG. 4b) provide three point support for the slide tray 40 in slidable contact with the bearing surfaces 49.

A lead screw 51 is provided which cooperates with a return spring 52 to provide a means of motivating the wedge 48. This system is described in greater detail in conjunction with FIG. 4 below. A pair of guide rollers 53 and 54 are provided to keep the wedge member 48 properly aligned at all times. The leveling screws 55, 56 and 57 mounted in a base plate 58 are utilized to provide three point support and to level the upper surface of the wedge-shaped member 48 such that member 40 supported thereon remains parallel to the x—y plane (normally a horizontal plane) at all times.

Figure 3:
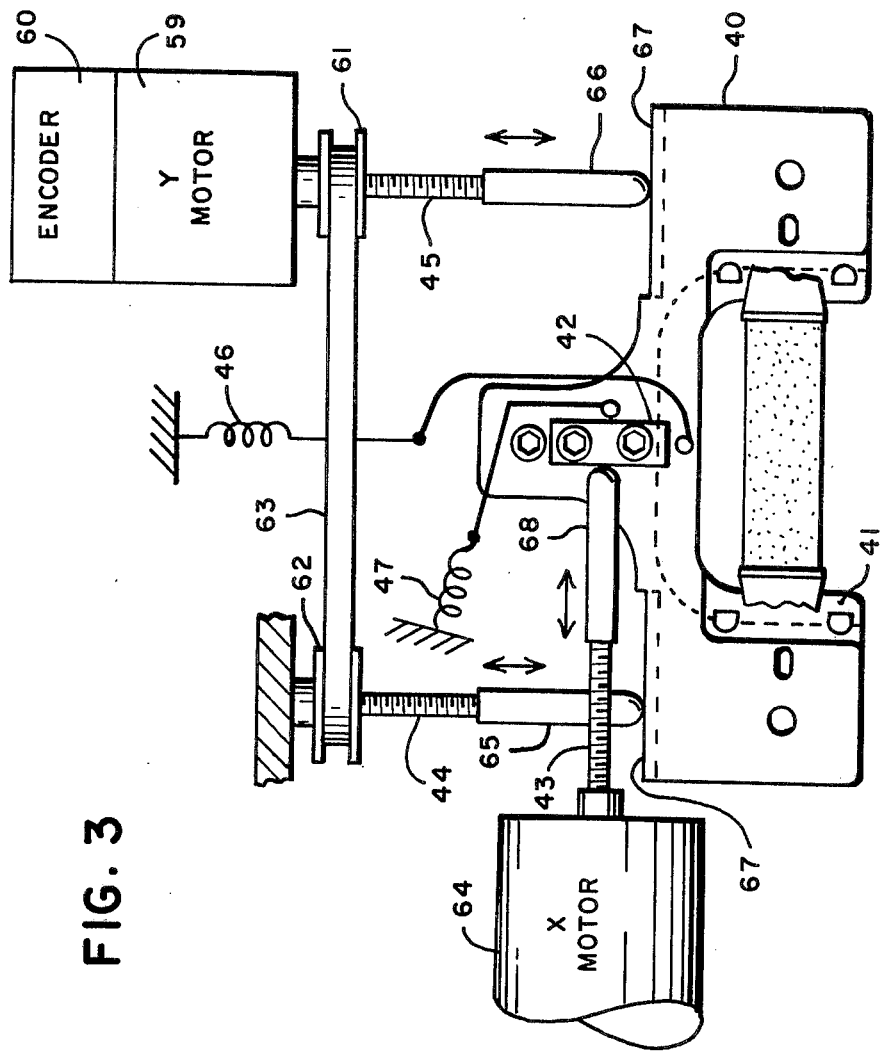
FIG. 3 is a plan view of the $x$—$y$ plane portion of the stage positioning system of the invention.

FIG. 3 depicts in greater detail the positioning system which operates to position the slide carrier in the x—y plane. The pair of y directed lead screws 44 and 45 are driven as by motor 59 which is associated with a precise encoder 60. To assure that both screw 44 and 45 rotate in unison a toothed sprocket and chain system including sprockets 61 and 62 and chain represented by 63 are provided to rotate screw 44 in unison with driven screw 45. A conventional adjustable tensioning means (not shown) may be used to provide the desired drive system tension. Similarly, lead screw 43 is provided with a motor 64 and associated encoder (not shown).

The precise operation of the stage in the y direction is accomplished by controlled rotation of the y motor such that the screws 44 and 45 are rotated in unison which causes associated nuts 65 and 66 also to move in unison in the y direction. Slide carrier 40 is maintained against the nuts 65 and 66 by the springs 46 and 47 such that the edges 67 of slide tray 40 remain parallel to the x axis. As the slide carrier moves forward and backward in the y direction it is guided by nut 68 as it slides along raised guide 42. The spring 47 maintains the nut 67 against the wear surface of the guide 42. Similarly, motion in the x direction is accomplished by rotation of the lead screw 43 which causes a corresponding motion of the associated nut 67 along the x axis. Again, the nut 67 is maintained against the wear surface of guide 42 by the spring 47. Motion in the x direction is guided by the nuts 65 and 66 which are maintained against the wear surface 68 of the slide carrier 40 by the vector spring 46. Thus, as in its mounting support system above, the slide tray 40 is continually maintained by three point support nuts 65, 66 and 68 to positively determine its horizontal travel.

Thus, it can readily be seen that by proper operation of the x and y servo motors the microscope slide tray 40 and therefore the microscope slide itself can be driven to any x or y coordinate position. By proper combinations of screw threads, servo motors and encoders and utilizing stored data x—y coordinates, extreme accuracy can be achieved. In one successful embodiment utilizing encoders having 200 pulses per revolution and screw threads of 50 threads/inch the stage can be repeatedly driven to within plus or minus 2.5 microns of any such stored coordinate point.

Figure 4A:
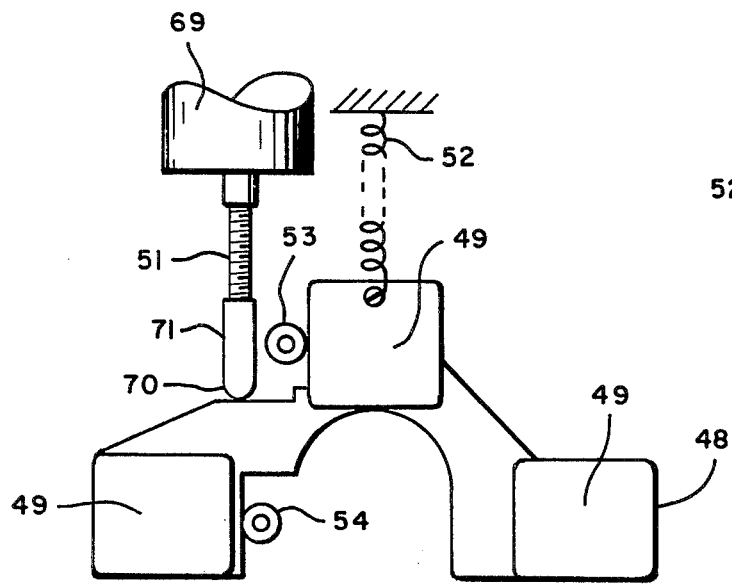
FIGS. 4a – 4c depict the $z$ axis positioning system of the invention.
Figure 4C:
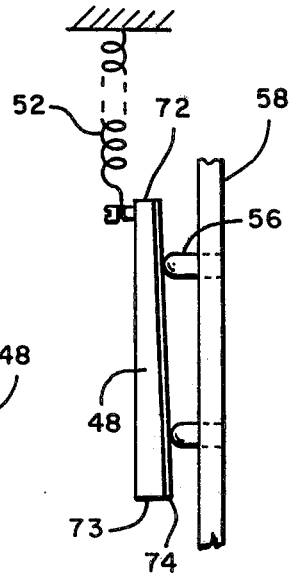
Figure 4B:
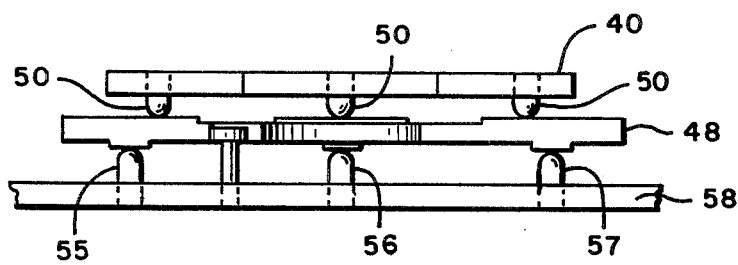

FIGS. 4a–4c depict the z drive mechanism of the microscope stage positioning system of the invention. The wedge 48 is driven in a fashion similar to the x and y drive systems. Thus, a servo motor 69 which is associated with an encoder (not shown) drives the z axis lead screw 51 which is held against the surface 70 of the wedge 48 using contact nut 71 by return spring 52 as shown in FIG. 4a. Alignment of the wedge 48 is maintained by applying the rotational torque produced by the displacement of spring 52 and screw 51 to maintain the wedge against guide rollers 53 and 54 along which the wedge moves forward and backward in response to the motion of the lead screw 51.

The wedge shape of the wedge 48 can best be seen in FIG. 4c wherein the thickness of the wedge 48 gradually increases from surface 72 to surface 73. Wear or bearing surfaces, as at 74, are provided so that wedge 48 is freely slidable on leveling screws 55, 56 and 57. The leveling screws 55–57 are normally precisely adjusted during the assembly of the system such that the top surface of the wedge member 48 is maintained in the precise plane, normally horizontal, desired. Because of the wedge shape of the member 48 it can readily be seen that the motion of the wedge in conjunction with the nut 71 contacting the surface 70 and the return spring 52 will cause the top surface of the wedge member 48 to be raised or lowered a slight amount while maintaining its upper surface in a precise predetermined plane.

FIG. 4b shows the relationship of the slide tray 40, with associated leveling screws 50, and wedge 48 with its leveling screws 55–57 which are in the base member 58. It can readily be seen that wherever sliding motion as between members takes place required wear surfaces are provided. These may be in the form of replaceable wear bars or machined bearing surfaces. It is also noteworthy that both the wedge 48 and the slide tray 40 are provided with three point support as has been described. This precludes rocking or other instabilities associated with attempts to level systems having four or more support points.

The three servo motors which are utilized to rotate the three lead screws may be conventional servo motors and, in one successful embodiment, Honeywell Inc., Microswitch Division, Motor-tachometers (Identification No. 91929; new catalog listing 2VM61-033-4) were used. The encoders are mounted on the servo motors to provide precise x—y coordinates of the location of particular points of interest on a given specimen slide into the microprocessor storage and to provide capability for automatic return of the slide carrier to the stored coordinates so that the same image may again be viewed. In conjunction with the automation of the microscope of which the drive of the present invention is a part, the display means 35 may also display the coordinates which represent the location of the slide carrier such that the operator may observe and note specific locations. One successful embodiment has utilized encoders which are Model 992-200-O-C-L-P by Disc Instruments Inc. of Costa Mesa, Calf., which were installed on the above Honeywell servo motors. Those encoders operate on 200 pulses per revolution. Details of the input which is utilized to operate the automatic positioning system of the present invention do not form a part of the invention and are explained in greater detail in the above-referenced copending application of Adkisson, et al.

Figure 5A:
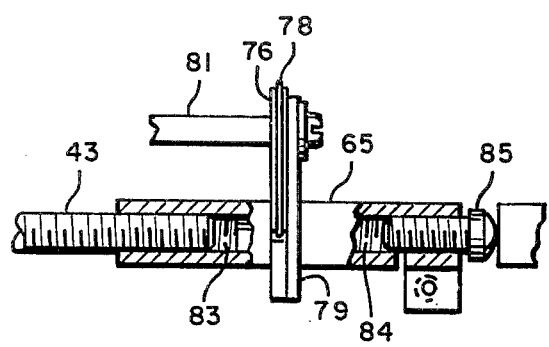
FIGS. 5a – 5d represent an enlarged view of a typical assembly of a lead screw of the invention.
Figure 5C:
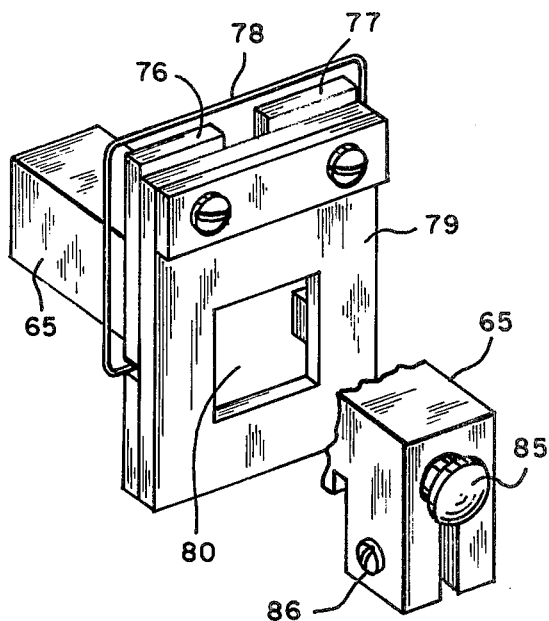
Figure 5B:
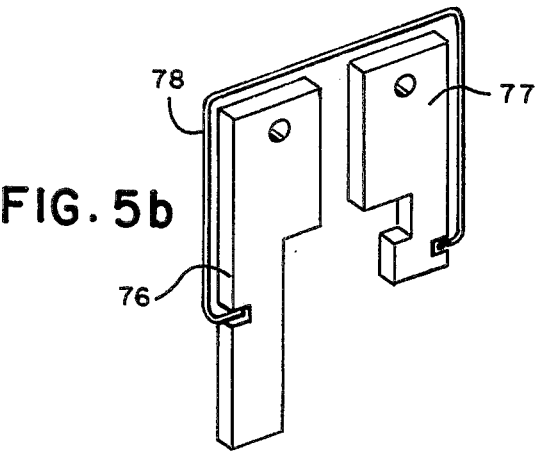
Figure 5D:
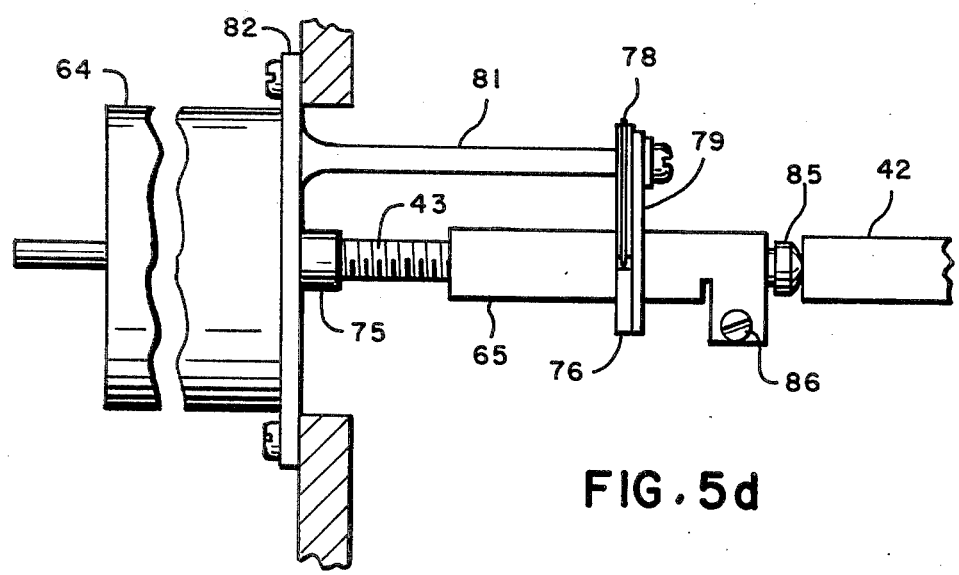

In order to prevent rotation of the pusher nuts 65, 66, 68 and 71, special anti-rotation devices are provided as illustrated in FIGS. 5a–d. FIG. 5a shows a view of a typical lead screw and nut in which, for illustrative purposes, lead screw 43 and nut 65 have been used.

The lead screw 43 is secured to the motor shaft 75 in a conventional manner to effect a continuation thereof. The nut 65 is provided with a generally rectangular outer geometry. A pair of retaining members 76 and 77 are provided which flank the nut 65 and are held against opposite outer surfaces thereof as by a retaining spring 78. A third retaining member 79 is provided which has a rectangular opening 80 therein. The member 79, along with cooperating members 76 and 77, are sequentially assembled to form a composite anti-rotation support for the nut 65. Thus, the members 76, 77 and 79 are secured to a rigid member 81 which may be an integral part of the motor mount casting 82 (FIG. 5). The nut 65 is then slidably supported in the support in a manner which also prevents it from rotating with the screw 43.

The nut 65 has a generally hollow interior having threaded portions 83 and 84. Matching threads on the screw 43 operate in conjunction with the rotation of the motor 64 to impart axial motion of the nut 65. An adjustable contact foot 85 is threadably attached in threaded portion 84 and secured therein as by a locking screw 86.

The particular construction used to slidably support the nut 65 obviates the necessity of precisely matching the dimensions of the opening 80 to the nut 65 as the retention of the members 76 and 77 against the nut 65 by the spring 78 prevents any relative motion of the nut 65 within the support.

It can be readily seen from the above that the automatically controllable slide carriage positioning means of the present invention presents a positive compact system for precisely positioning a microscope slide in relation to the other parts of the microscope system. The $x-y$ plane drive provides a system to examine a microscope object slide in conjunction with an automatic microscope system such that a meander path, for example, may be established and followed and, upon the detection of, for example, white blood cells, same can be centered in the field of view of the microscope.

Adjustment along the $z$ axis, as readily discernable from FIGS. 4a through 4c, depends on translating the axial movement of screw 51 in conjunction with nut 71 in a motion at 90° with that axial motion of the upper surface of the wedge 48 and thus is dependent upon the pitch of the lower surface of the wedge 48 for its traverse. Normally the $z$ axis motion in regard to the precise stage positioning of the invention is utilized for automatically focusing the specimen slide in the optical system of the microscope. It has been found that utilizing a normal traverse of the wedge 48 which is about one inch, a slope from about 1° to about 2° in the wedge is sufficient to provide the required range of focus in a light microscope system. Utilizing the system of the present invention, increments as small as 0.025 micron can be achieved in the movement of the upper surface of the wedge 48 to achieve a precise focusing of the specimen slide in the field of view of the microscope optical system. Assuming, as is normally the case, that the $z$ axis movement is vertical in nature, the particular illustrated embodiment is such that the outward thrust of the nut 71 in conjunction with the lead screw 51 actually drives the wedge and therefore the $x-y$ plane of the slide carrier down and the return vector spring 52 provides the force to raise the slide carrier upon the axial retraction of the screw 51. Of course, these functions can be readily reversed.

An important advantage of the microscope positioning system of the present invention lies in the fact that it achieves precision adjustment of the stage without the need for precision parts. This greatly reduces the system cost and complexity without any corresponding sacrifice in accuracy.

The embodiments of the invention in which an exclusive property or right is claimed are defined as follows:

1. A precision, automatically controllable microscope state positioning system, said system comprising:
    a slide carrier means for carrying a mounted object slide;
    a stationary stage support base member disposed beneath said slide carrier means;
    a wedge-shaped member sandwiched in slidable relation between said slide carrier means and said base member, such that slide carrier means is freely slidably carried on the upper surface of said wedge-shaped member and said wedge-shaped member is slidably mounted on said base member in a manner such that the movement thereof substantially parallel to the wedge taper produces a corresponding movement of the upper surface of the wedge shaped member along the $z$ axis perpendicular to the upper surface thereof,
    $x$ and $y$ drive means for precisely positioning said slide carrier means in the $x-y$ plane, said $x-y$ plane being parallel to said surface of said wedge-shaped member, by the movement thereof along the $x$ and $z$ axes of said plane, said $x$ and $y$ drive means further comprising
        independent axially adjustable, reversible pusher means operating against said slide carrier means for urging said slide carrier means in one direction along each of said $x$ and said $y$ axes;
        resilient return means opposing said pusher means and holding said slider carrier means in continual contact therewith; and
    $z$ drive means for positioning said slide carrier means along the $z$ axis, said $z$ axis being perpendicular to said $x-y$ plane, said drive means comprising independent axially adjustable, reversible pusher means operating against said wedge-shaped member for urging said wedge-shaped member in one direction parallel to said taper;
        resilient return means opposing said pusher means and holding said wedgeshaped member in continual contact therewith;
    reversible actuating means for axially adjusting said pusher means; and
    control means for controlling said actuating means.

2. The positioning system of claim 1 further comprising alignment means for maintaining the alignment of said slide carrier means in said $x-y$ plane.

3. The positioning system of claim 2 wherein said alignment means for maintaining the alignment of said slide carrier means in said $x-y$ plane further comprises:
    in said $y$ drive, a pair of said pusher means aligned in in spaced parallel relation, such that the ends thereof applying said force are maintained equidistant from the $x$ axis, and wherein said pusher means are operated in unison and in conjunction with one of said resilient return means;
    in said $x$ drive pusher means operating in conjunction with one of said resilient return means;
    contact surfaces on said slide carrier means along which the contacting ends of each of said pusher means are freely slidable;
    said elements of said alignment means being disposed such that said three pusher means cooperate with said resilient return means and said contact surfaces to maintain said slide carrier means against said three pusher means thereby providing continuous three point alignment for said slide carrier means.

4. The positioning system of claim 1 wherein said resilient return means comprise return springs.

5. The positioning system of claim 1 further comprising adjustable leveling means between said wedge-shaped member and said base member for maintaining the upper surface of said wedge-shaped member parallel to said $x-y$ plane.

6. The positioning means of claim 5, wherein said leveling means provides three point support for said wedge on said stage support member.

7. The positioning system of claim 6 wherein said adjustable leveling means comprises three adjustable leveling screws, said wedge member being slidably mounted thereon.

8. The positioning means of claim 1 further comprising adjustable leveling means for leveling said slide carrier means relative to said wedge.

9. The positioning system of claim 8 wherein said leveling means provides three point support for said slide carrier means in said $x-y$ plane.

10. The positioning system of claim 9 wherein said three point leveling means comprises three leveling screws.

11. The positioning system of claim 1 wherein each of said drive means comprises lead screws and means for reversibly rotating said lead screws.

12. The positioning system of claim 11 wherein each of said drive means further comprises:
   nut means threadably attached to said lead screw,
   anti-rotation support means associated with said nut for slidably mounting said nut therethrough, said anti-rotation means being adapted to slidably contact said nut wherein the contacting surfaces of both said anti-rotation means and the outer surface of said nut are of a non-round geometry such that said nut means is caused to move axially along said lead screw with the rotation of said lead screw.

13. The positioning system of claim 12 further comprising resiliently held locking means in said anti-rotation support means, said locking means comprising retaining members held against opposite outer surfaces of said nut by a resilient retainer.

14. The positioning system of claim 12 wherein each of said drive means further comprises motor means for rotating said lead screw and encoder means for controlling the rotation of said motor means in response to signal input thereto.

15. The positioning system of claim 1 further comprising guide means for maintaining the alignment of said wedge member relative to said support member, said guide means comprising:
   guide rollers adjacent offset sides of said wedge,
   said pusher drive means operating in conjunction with said resilient return means offset from said pusher means such that said pusher means and said return means operate to produce a rotational torque on said wedge which maintains said wedge against said guide rollers and said pusher means thereby providing three point alignment for said wedge.

* * * * *

UNITED STATES PATENT OFFICE
CERTIFICATE OF CORRECTION

PATENT NO. : 4,012,112
DATED : March 15, 1977
INVENTOR(S) : EARL E. MASTERSON

It is certified that error appears in the above-identified patent and that said Letters Patent are hereby corrected as shown below:

In Column 7, line 61, delete "state" and insert the word --stage--.

In Column 7, line 68, add the word --said-- after the word "that".

In Column 8, line 11, add the word --upper-- after the word "said".

In Column 8, line 13, delete "z" and insert the word --y--.

Signed and Sealed this

Seventh Day of June 1977

[SEAL]

Attest:

RUTH C. MASON
Attesting Officer

C. MARSHALL DANN
Commissioner of Patents and Trademarks